(12) United States Patent
Lee et al.

(10) Patent No.: US 9,435,587 B2
(45) Date of Patent: Sep. 6, 2016

(54) CLOTHING DRYER AND BLOCKAGE DETECTION METHOD THEREOF

(71) Applicant: SAMSUNG ELECTRONICS CO., LTD., Suwon-si (KR)

(72) Inventors: Hyung Woo Lee, Suwon-si (KR); Hee Beom Park, Anyang-si (KR); Sang Oh Yoo, Seoul (KR); Geun Kang, Suwon-si (KR); Pil Soo Chang, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 649 days.

(21) Appl. No.: 13/851,319

(22) Filed: Mar. 27, 2013

(65) Prior Publication Data

US 2013/0255101 A1 Oct. 3, 2013

(30) Foreign Application Priority Data

Mar. 30, 2012 (KR) .................. 10-2012-0033220
Sep. 26, 2012 (KR) .................. 10-2012-0107504

(51) Int. Cl.
*F26B 25/00* (2006.01)
*G01K 13/02* (2006.01)
*D06F 58/28* (2006.01)
*D06F 58/20* (2006.01)
*D06F 58/22* (2006.01)

(52) U.S. Cl.
CPC ............ *F26B 25/009* (2013.01); *D06F 58/28* (2013.01); *G01K 13/02* (2013.01); *D06F 58/20* (2013.01); *D06F 58/22* (2013.01); *D06F 2058/2829* (2013.01); *D06F 2058/2858* (2013.01); *G01K 2013/024* (2013.01); *G01K 2207/00* (2013.01)

(58) Field of Classification Search
CPC .............. D06F 2058/2829; D06F 2058/2858; D06F 2058/2854; D06F 2058/289; D06F 58/20; D06F 58/22; D06F 58/28; G01K 13/02; G01K 2013/204; G01K 2207/00; F26B 25/009
See application file for complete search history.

(56) References Cited

U.S. PATENT DOCUMENTS

| 7,866,059 B2* | 1/2011 | Yoo | .................. D06F 58/28 34/427 |
| 2008/0072450 A1* | 3/2008 | Kim | .................. D06F 58/28 34/524 |
| 2008/0078100 A1* | 4/2008 | Kim | .................. D06F 58/28 34/524 |
| 2008/0098615 A1* | 5/2008 | Kim | .................. D06F 58/28 34/493 |

FOREIGN PATENT DOCUMENTS

| CN | 1724799 | 1/2006 |
| CN | 101139792 | 3/2008 |
| CN | 101240500 | 8/2008 |
| EP | 0312072 | 4/1989 |
| GB | 1502919 | 3/1978 |

OTHER PUBLICATIONS

Chinese Office Action issued Jan. 19, 2016 in Chinese Patent Application No. 201310111484.2.

* cited by examiner

*Primary Examiner* — Jiping Lu
(74) *Attorney, Agent, or Firm* — Staas & Halsey LLP

(57) ABSTRACT

A method for detecting a degree of blockage of an exhaust duct includes detecting the temperature of air in an intake and exhaust system, calculating a rate of change of the detected temperature, and determining a degree of blockage of the exhaust duct based on the detected temperature and the rate of change of the detected temperature.

14 Claims, 11 Drawing Sheets

CLOTHING DRYER AND BLOCKAGE DETECTION METHOD THEREOF

CROSS-REFERENCE TO RELATED APPLICATIONS

This application claims the priority benefit of Korean Patent Applications No. 10-2012-0033220, filed on Mar. 30, 2012 and No. 10-2012-0107504, filed on Sep. 26, 2012, in the Korean Intellectual Property Office, the disclosures of which are incorporated herein by reference.

BACKGROUND

1. Field

The following description relates to a dryer configured to dry a substance such as clothing, and more particularly, to a dryer configured to detect and display the degree of an exhaust blockage of the dryer, and a blockage detection method thereof.

2. Description of the Related Art

A dryer is an apparatus configured to dry a substance by supplying high-temperature moving air heated by a hot blast heater into an inside of a drying container (a drum) while the drum having the clothing accommodated to be dried (hereinafter called a substance) is being rotated. The dryer as such may be classified into an exhaust-type dryer configured to exhaust the high-temperature, high-moisture air that is passed through the drum to the outside of the dryer, and a condensation-type dryer configured to remove moisture from the high-temperature, high-moisture air that is passed through the drum and to circulate the air inside the drum.

The exhaust-type dryer described above is configured to exhaust the heated air, which is passed through the drum, through an exhaust duct to the outside of the dryer. At this time, the lint generated from the substance is included with the air, and is discharged. Thus, by installing a filter member configured to filter the lint, so that the lint generated from the substance is not accumulated in the exhaust duct, the blockage of the exhaust duct by the lint is prevented.

However, the lint accumulates at the exhaust duct as the dryer is being used for a period of time, and as a result of the above, the flow of the air is not freely discharged to the outside of the dryer, and thus the drying performance is reduced, and the power consumption or the noise of a draft fan is increased.

In addition, in a case of installing the dryer, an installer should know whether the installation environment is suitable for the operation of the dryer, such as when an outside exhaust duct, which is configured to guide the air that is passed through the drum to discharge the air to the outside of the dryer, is blocked. Accordingly, although the body of the dryer is in a normal status, because of the blockage of the outside exhaust duct, the flow of the air may not occur. However, because a conventional dryer is configured to detect the degree of blockage only during the drying process while containing the substance, when the substance is not present, the blockage detection function may not operate at all or may be provided with a large margin of error. As a result, the suitability with respect to the installation environment may not be diagnosed at the time of an initial installation of the dryer, before the substance is introduced.

SUMMARY

Therefore, it is an aspect of the present disclosure to provide a dryer capable of detecting and displaying the degree of a blockage of an exhaust duct configured to discharge air to the outside of the dryer, and a blockage detection method thereof.

A degree of blockage of an exhaust duct due to lint accumulation or a faulty exhaust duct installation, for example, may be detected by measuring the temperature of heated air used by the dryer. This degree of blockage may be detected prior to using the dryer to dry clothes, such as during an installation of the dryer, for example. An unexpected increase in temperature may indicate a blockage in the exhaust, and the rate and/or amount of increase in temperature may correspond to a degree of blockage in the exhaust. Accordingly, an indication of the degree of blockage may be provided to a user in the form of a display, and the indication may correlate a degree of blockage with a level of maintenance required by a user to clear the blockage.

Additional aspects of the disclosure will be set forth in part in the description which follows and, in part, will be obvious from the description, or may be learned by practice of the disclosure.

In accordance with an embodiment of the present disclosure, a dryer includes a drum, a temperature sensor, a heater, an exhaust duct, a thermostat and a control unit. The drum may be configured to accommodate a substance to be dried. The temperature sensor may be configured to detect a temperature of an entry of the drum. The heater may be configured to supply hot air to the inside of the drum. The exhaust duct may be configured to discharge the hot air passed through the drum. The thermostat may be configured to ON/OFF-control a power applied to the heater while operating according to the temperature of the heater. The control unit may be configured to detect a degree of a blockage of the exhaust duct by measuring the temperature of the entry of the drum and a time at each point in time of an operation of the thermostat in a case when the thermostat is operated at least twice.

The temperature sensor may be a thermistor to detect the temperature of the hot air being introduced to the inside of the drum.

The thermistor may be installed at a hot blast duct configured to introduce hot air to the inside of the drum.

The control unit, in a case that a rate of temperature change of the thermistor exceeds a reference rate of change at a predetermined point in time, may determine the point in time as a point in time of the operation to measure the temperature of the entry of the drum and the time.

The point in time of the operation may include a first point in time of the operation when the heater is turned OFF according to the operation of the thermostat, and a second point in time of the operation when the heater is turned ON after being turned OFF according to the operation of the thermostat.

The first point in time of the operation may be a point in time when a temperature (TB1) of the entry of the drum detected by the thermostat is provided with a maximum value (TBMax).

The second point in time of the operation may be a point in time when the temperature (TB2) of the entry of the drum detected by the thermostat is provided with the minimum value (TBMin).

The control unit may be configured to calculate a temperature difference ($\Delta T$) between the maximum temperature (TB1) at the first point in time of the operation and the minimum temperature (TB2) at the second point in time of the operation, calculate a time difference ($\Delta t$) between a time (t1) at the first point in time of the operation and a time (t2)

at the second point in time of the operation, and detect the degree of the blockage of the exhaust duct by using the temperature difference ($\Delta T$) and the time difference ($\Delta t$) that are calculated.

The control unit may store a table capable of calculating the degree of the blockage of the exhaust duct by use of the temperature difference ($\Delta T$) and the time difference ($\Delta t$).

The control unit may be configured to detect the degree of the blockage of the exhaust duct at each stage level based on a data stored in the table.

The control unit may be configured to display the detected degree of the blockage of the exhaust duct at each stage level through a display unit.

In a case that the display unit is a liquid crystal display (LCD), the display unit may be configured to display different warning messages in the form of text based on the degree of a blockage of the exhaust duct.

The display unit may be configured to display the warning message in a form of an expression of emphasis including colorization, boldfacing, and italicization or in a continuous manner for a predetermined period of time.

In a case that the display unit is a light emitting diode (LED), the display unit may be configured to display a blockage icon by lighting or flashing the blockage icon based on the degree of the blockage of the exhaust duct.

The display unit may be configured to continuously display the blockage icon for a predetermined period of time.

The thermostat may be a safety apparatus installed at a side surface or adjacent to the heater and configured to mechanically operate based on the temperature of the heater.

The exhaust duct may include a front exhaust duct and a rear exhaust duct to guide the discharging of the air that is passed through the drum, and an outside exhaust duct connected to the rear exhaust duct to guide the discharged air to an outdoor location.

In accordance with an aspect of the present disclosure, a blockage detection method of a dryer having a drum to accommodate a substance to be dried, a heater to supply hot air to the inside of the drum, and an exhaust duct to discharge the hot air that is passed through the drum is as follows. Whether the thermostat is operated according to a temperature of the heater may be determined. If the thermostat is operated, a temperature of an entry of the drum and a time at a point in time of the operation of the thermostat may be measured. Whether the thermostat is operated at least twice may be determined. If the thermostat is operated at least twice, a difference between the temperatures of the entry of the dryer measured at each point in time of the operation of the thermostat and a difference between the times measured at each point in time of the operation of the thermostat may be calculated. The degree of the blockage of the exhaust duct may be detected by using the calculated temperature difference and the calculated time difference.

The blockage detection method may further include a temperature sensor to detect the temperature of the entry of the drum. The temperature sensor may be a thermistor configured to detect a temperature of the hot air being introduced to an inside the drum.

The measuring of the temperature of the entry of the drum and the time is as follows. The temperature of the entry of the drum and the time may be measured in a case when a rate of temperature change of the thermistor exceeds a reference rate of change.

The point in time of the operation of the thermostat may include a first point in time of the operation when the heater is turned OFF according to the operation of the thermostat, and a second point in time of the operation when the heater is turned ON after being turned OFF according to the operation of the thermostat.

The first point in time of the operation may be a point in time when a temperature (TB1) of the entry of the drum, which is detected by the thermistor, is provided with a maximum value (TBmax).

The second point in time of the operation may be a point in time when a temperature (TB2) of the entry of the drum, which is detected by the thermistor, is provided with a minimum value (TBmin).

The calculating of the temperature difference of the entry of the drum and the time difference is as follows. A temperature difference ($\Delta T$) between the maximum temperature (TB1) at the first point in time of the operation and the minimum temperature (TB2) at the second point in time of the operation may be calculated. A time difference ($\Delta t$) between a time (t1) at the first point in time of the operation and a time (t2) at the second point in time of the operation may be calculated.

The detecting of the degree of the blockage of the exhaust duct may be as follows. The degree of the blockage of the exhaust duct may be detected at each stage level by using the temperature difference ($\Delta T$) and the time difference ($\Delta t$) that are calculated.

The blockage detection method may be achieved by further performing as follows. The detected degree of the blockage of the exhaust duct at each stage level may be displayed through the display unit.

In accordance with an aspect of the present disclosure, a dryer includes a drum, a temperature sensor, a heater, an exhaust duct, an input unit, and a control unit. The drum may be configured to accommodate a substance to be dried. The temperature sensor may be configured to detect a temperature of an exit of the drum. The heater may be configured to supply hot air to the inside of the drum. The exhaust duct may be configured to discharge the hot air passed through the drum. The input unit may be configured to select a diagnosis mode configured to diagnose a blockage of the exhaust duct in a state when the substance is not present at an inside the drum. The control unit, in a case when the diagnosis mode is selected, may be to detect the temperature of an exit of the drum through the temperature sensor that varies with time by operating the heater, and to distinguish a degree of a blockage of the exhaust duct at each stage level by using the detected temperature of the exit of the drum.

The temperature sensor may be a control-purpose thermistor to detect a temperature of the air that is passed through the drum.

The thermistor may be installed at the exhaust duct configured to discharge the air that is passed through the drum.

The control unit may be configured to determine the degree of a blockage of the exhaust duct at each stage level by calculating an amount of temperature change of the drum, and comparing the calculated amount of temperature change of the drum with a reference amount of change.

The control unit may be configured to perform the diagnosis mode at a time of installation of the dryer.

The control unit may be configured to perform the diagnosis mode at a time when a user is needed to self-diagnose the blockage of the dryer.

The dryer may further include a warning unit to generate a warning at a point in time when the degree of the blockage of the exhaust duct is distinguished at each stage level.

The dryer may further include a display unit configured to display the degree of the blockage of the exhaust duct at each stage level.

In accordance with an aspect of the present disclosure, a blockage detection method of a dryer having a drum to accommodate a substance to be dried, a heater to supply hot air to the inside of the drum, and an exhaust duct to discharge hot air that is passed through the drum is as follows. Hot air may be supplied to the inside of the drum according to an operation of the heater while in a state when the substance is not present in the drum. A temperature of an exit of the drum that varies with time may be detected. A degree of a blockage of the exhaust duct may be distinguished at each stage level by using the detected temperature of the exit of the drum. The degree of the blockage of the exhaust duct that is distinguished at each stage level may be indicated.

The blockage detection method may further include a temperature sensor to detect the temperature of the exit of the drum. The temperature sensor may be a thermistor to detect a temperature of the air that is passed through the drum.

In accordance with an aspect of the present disclosure, a blockage detection method of a dryer having a drum to accommodate a substance to be dried, a heater to supply hot air to the inside of the drum, and an exhaust duct to discharge the hot air that is passed through the drum is as follows. When the dryer is installed, an amount of temperature change may be detected by operating the heater while in a state that the substance is not present in the drum. A degree of a blockage of the exhaust duct may be distinguished at each stage level by comparing the amount of temperature change with a reference amount of change while in the state that the substance is not present in the drum. The degree of the blockage of the exhaust duct may be indicated to a user each time when the degree of the blockage of the exhaust duct is distinguished at each stage level.

In accordance with the dryer and the blockage detection method suggested, by detecting and displaying the degree of a blockage of the exhaust duct that discharges air to the outside of the dryer during a drying process, a user may be able to easily confirm the degree of a blockage of the exhaust duct. In addition, by displaying the degree of a blockage of the exhaust duct at each stage level, a user is enabled to properly respond to the degree of a blockage of the exhaust duct, and by cleaning the exhaust duct at a proper time, the degradation of a drying performance may be prevented, and also the increase of the power consumption and noise may be prevented.

In addition, because the degree of a blockage of the exhaust duct is detected early in the drying process, a fire that may be caused by the overheating of the dryer may be prevented, and the distinction of the degree of a blockage of the exhaust duct may be possible with a high accuracy.

In addition, even during the installation of the dryer or under the condition in which the substance is not present in the drier, through the diagnosis algorithm and the user interface that are capable of precisely detecting the degree of a blockage of the exhaust duct, a diagnosis with respect to the suitability of a dryer installation environment may be determined, or a user may perform a self-diagnosis.

In addition, because the degree of a blockage of the exhaust duct may be directly acknowledged by a user during a blockage diagnosis process of the dryer, a user convenience may be greatly enhanced.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
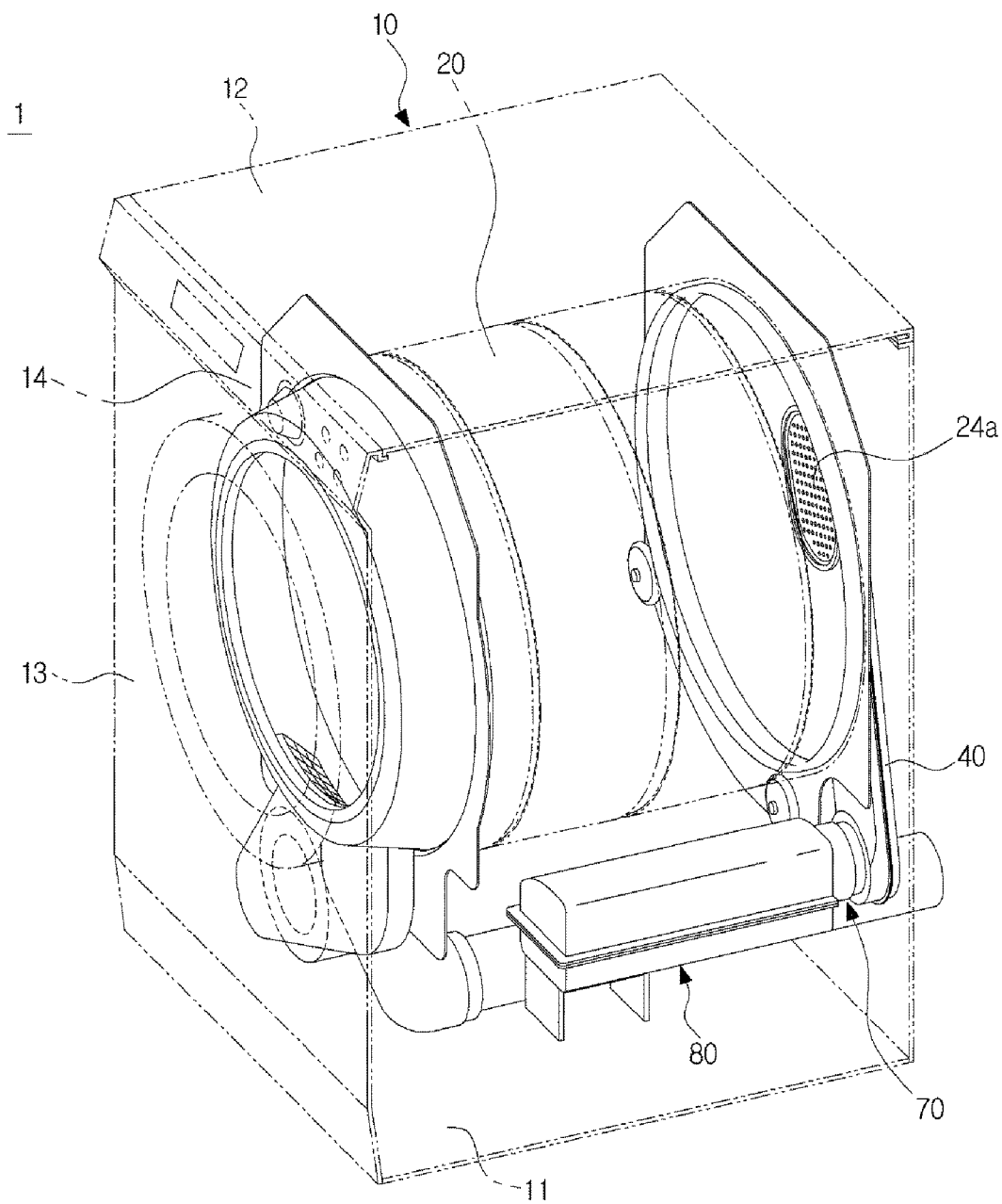
FIG. 1 is a perspective view of a dryer in accordance with an embodiment of the present disclosure.

Reference will now be made in detail to the embodiments of the present disclosure, examples of which are illustrated in the accompanying drawings, wherein like reference numerals refer to like elements throughout.

Figure 2:
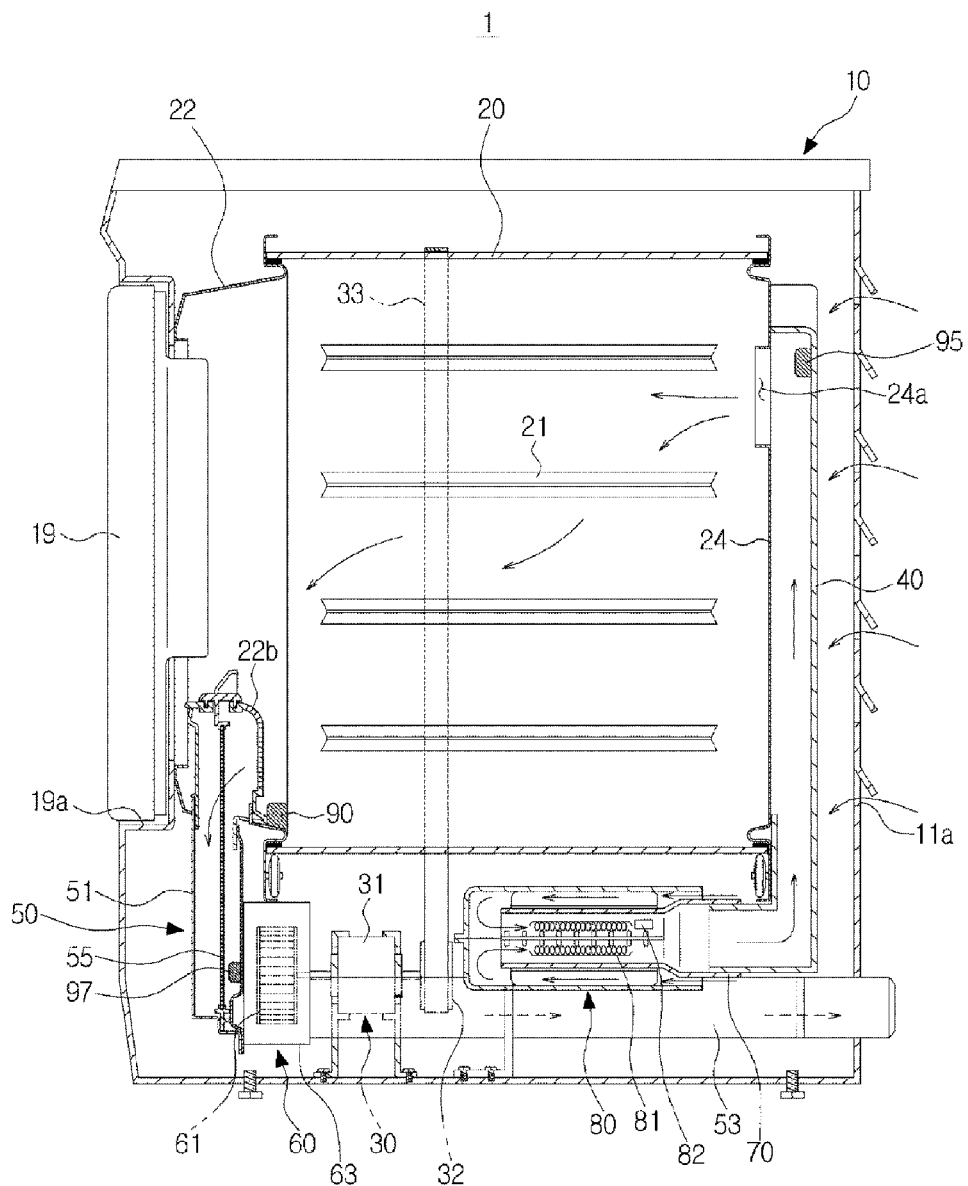
FIG. 2 is a side cross-sectional view of the dryer illustrated on FIG. 1.

FIG. 1 is a perspective view of a dryer in accordance with an embodiment of the present disclosure, and FIG. 2 is a side cross-sectional view of the dryer illustrated on FIG. 1.

In FIG. 1 and FIG. 2, a dryer 1 in accordance with an embodiment of the present disclosure includes a body 10 composed approximately in a hexagonal shape, a drum 20 rotatably installed inside the body 10 and having a space in which a substance such as clothing, for example, is dried, a driving apparatus 30 to rotate the drum 20, and a hot air duct 70 to supply hot air to the drum 20.

The body 10 includes a cabinet 11, a top cover 12 to cover an upper portion of the cabinet 11, a front surface panel 13 disposed at a front surface of the cabinet 11, and a control panel 14 at which various buttons and a display configured to control the dryer 1 are disposed.

The drum 20 is provided in a cylindrical shape having a front surface and a rear surface thereof open, and includes a plurality of lifters 21 protruding from an inside surface thereof in a crest shape, so that the substance may be lifted and dropped. In addition, at an inner side of the body 10, a front supporting panel 22 and a rear supporting panel 24 are fixed to an inner side of the front surface and an inner side of the rear surface of the body 10, respectively, to cover a front surface opening portion and a rear surface opening portion, respectively, while rotatably supporting the front surface opening portion and the rear surface opening portion of the drum 20, respectively.

At the front surface of the body 10 and at the front supporting panel 22, an inlet unit 19*a* is provided to insert the substance into the inside of the drum 20 or to withdraw the substance from the drum 20, and at the front surface of the body 10, a door 19 configured to open/close the inlet unit 19*a* is installed.

The driving apparatus 30 includes a driving motor 31 installed at a lower portion of an inner side of the cabinet 10, and a pulley 32 and a rotating belt 33 to deliver the driving force of the driving motor 31 to the drum 20. The rotating belt 33 is installed in a way to be wound at an outer surface of the drum 20 and at the pulley 32 coupled to an axis of the driving motor 31.

The hot air duct 70 includes a heating unit 80 to heat the air that is introduced, and a hot air supplying unit 40 to connect the heating unit 80 to the drum 20.

The hot air supplying unit 40 is connected between an intake unit 24*a* formed at an upper portion of the rear supporting panel 24 and the heating unit 80 to form an air flow path, and is configured to guide the introduced hot air to the drum 20.

The heating unit 80 is installed at a lower portion of the drum 20 to guide the introduction of outside air, and applies heat to the introduced air. The heating unit 80 includes a heater 81 to radiate heat inside the heating unit 80, as well as a thermostat 82 installed for the safety of the heater 81.

With reference to the heater 81, a coil heater is mainly used, and the heater 81 may be composed of at least one heater. At this time, with reference to the at least one heater, the heater may be provided with a different or an equivalent power capacity with respect to another heater that may be used. For example, in a case when an overall power capacity at approximately 100% is approximately 5.3 kW, the heater 81 may be composed of one heater using a large capacity of approximately 3.7 kW (approximately 70%) of the power capacity and another heater using a small capacity of approximately 1.6 kW (approximately 30%) of the power capacity. At this time, the heater capacity of the at least one heater is not required to be divided into a ratio of approximately 70%:30%, and may be divided into various ratios in the course of finding an optimal dividing condition.

The thermostat 82 is a safety apparatus installed at a side surface of or near the heater 81, and configured to mechanically operate by being turned ON/OFF with respect to the temperature of the heater 81. The thermostat 82, prior to the temperature of the heater 81 reaching at a predetermined overheated temperature, is configured to maintain an ON status, and when the temperature of the heater 81 reaches the overheated temperature, the heater 81 is changed into an OFF status, so that no power is applied to the heater 81.

In addition, an exhaust duct 50 is connected to a lower portion of a front of the drum 20, and the exhaust duct 50 is configured to guide a discharging of the air introduced to the inside of the drum 20. The exhaust duct 50 includes a front exhaust duct 51 connecting the in-between of an exhaust port 22*b* at a lower portion of the front supporting panel 22 and an entry of a blower apparatus 60 installed at a lower portion of the drum 20, and also includes a rear exhaust duct 53 installed at a lower side of the cabinet 11, so that an exit of the blower apparatus 60 and an outer side of a rear surface portion 11*a* of the cabinet 11 may be communicated to each other.

At the front exhaust duct 51, a filter member 55 is installed to filter the foreign substance such dust or lint, which is included in the hot air that is being discharged from the drum 20.

The blower apparatus 60 provided with an entry thereof connected to the front exhaust duct 51 includes a blower fan 61 installed at a front of a lower portion of the drum 20 for the circulation of air, and a blower case 63 surrounding the blower fan 61 and connected to the each of the front exhaust duct 51 and the rear exhaust duct 53.

In addition, at a lower end of a front surface of the drum 20 at which the exhaust duct 22*b* is formed, a dryness sensor 90 is installed, and the dryness sensor 90 is configured to determine the dryness of the substance by measuring the sensing value of an electrical signal that changes according to the amount of moisture contained in the substance, while making contact with the substance that is rotated according to the rotation of the drum 20. With reference to the dryness sensor 90, a touch sensor in the form of a plate bar, for example, may be used.

In addition, at an upper end of a rear surface of the drum 20 at which the intake unit 24*a* is formed, a first temperature sensor 95 is installed, and the first temperature sensor 95 is configured to detect the temperature of the air that is introduced into the drum 20, that is, the temperature of the entry of the drum 20.

In addition, at one side of the front exhaust duct 51, a second temperature sensor 97 is installed, and the second temperature sensor 97 is configured to detect the temperature of the air that is passed through the drum 20, that is, the temperature of the exit of the drum 20.

Meanwhile, the dryer 1 in accordance with an aspect of the present disclosure is described by using a case of when both the first temperature sensor 95 and the second temperature sensor 97 are installed as an example, while the first temperature sensor 95 is configured to detect the temperature of the entry of the drum and the second temperature sensor 97 is configured to detect the temperature of the exit of the drum. However, the present disclosure is not limited hereto, and may detect the degree of a blockage of the dryer by using the temperature of the entry of the drum or the temperature of the exit of the drum while the first temperature sensor 95 or the second temperature sensor 97 is installed.

Figure 3:
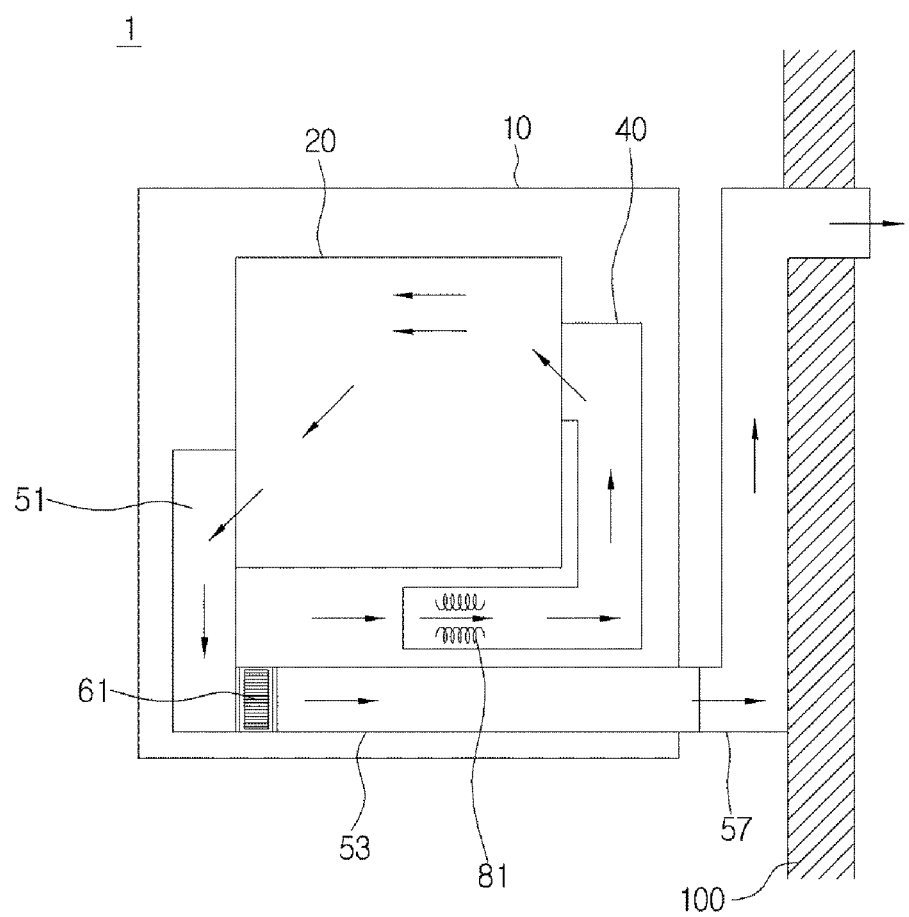
FIG. 3 is a drawing showing an installation status of the dryer in accordance with an embodiment of the present disclosure.

Meanwhile, the dryer 1 in accordance with an embodiment of the present disclosure further includes an outside exhaust duct configured to guide air to an outdoor location to discharge the air that is passed through the drum 20 to the outside of the dryer 1, and is shown on FIG. 3.

FIG. 3 is a drawing showing an installation status of the dryer in accordance with an embodiment of the present disclosure.

On FIG. 3, the outside exhaust duct 57 is provided outside the body 10, and is connected to the rear exhaust duct 53. The outside exhaust duct 57 may be installed to penetrate an inner wall 100 of a building to guide the air that is passed through the drum 20 to an outdoor location.

At the time of a drying process, the hot air that is passed through the drum 20 is guided along the front exhaust duct 51 and the rear exhaust duct 53, and is discharged to the outside through the outside exhaust duct 57. In the process, the lint generated from the substance is included in the hot air, and is discharged through the outside exhaust duct 57. At this time, to prevent the lint generated from the substance from being accumulated at the exhaust ducts 51, 53, and 57 while being discharged to the outside, the lint is filtered at the filter member 55, but if the dryer 1 is used for a long period of time, the lint may not be filtered at the filter member 55, and is accumulated at the exhaust ducts 51, 53, and 57.

When the exhaust ducts 51, 53, and 57 are blocked as the lint accumulates, the flow of the air that is discharged to an outside the dryer 1 is restricted, and thus a drying performance is reduced. Also, as the power consumption of the draft fan 61 is increased, noise is increased.

Thus, in accordance with an embodiment of the present disclosure, when the exhaust ducts 51, 53, and 57 are blocked as the lint is accumulated, by detecting and displaying the degree of a blockage of the exhaust ducts 51, 53, and 57, a user may be able to take a proper action.

In addition, in a state of an initial installation process or when the substance is not put into the dryer 1, by detecting the degree of a blockage of the dryer 1, the suitability of the dryer 1 with respect to the installation environment is diagnosed, or a user is enabled to use the detected degree of a blockage of the dryer 1 for a purpose of a self diagnosis. The above will be described by referring to FIG. 4.

Figure 4:
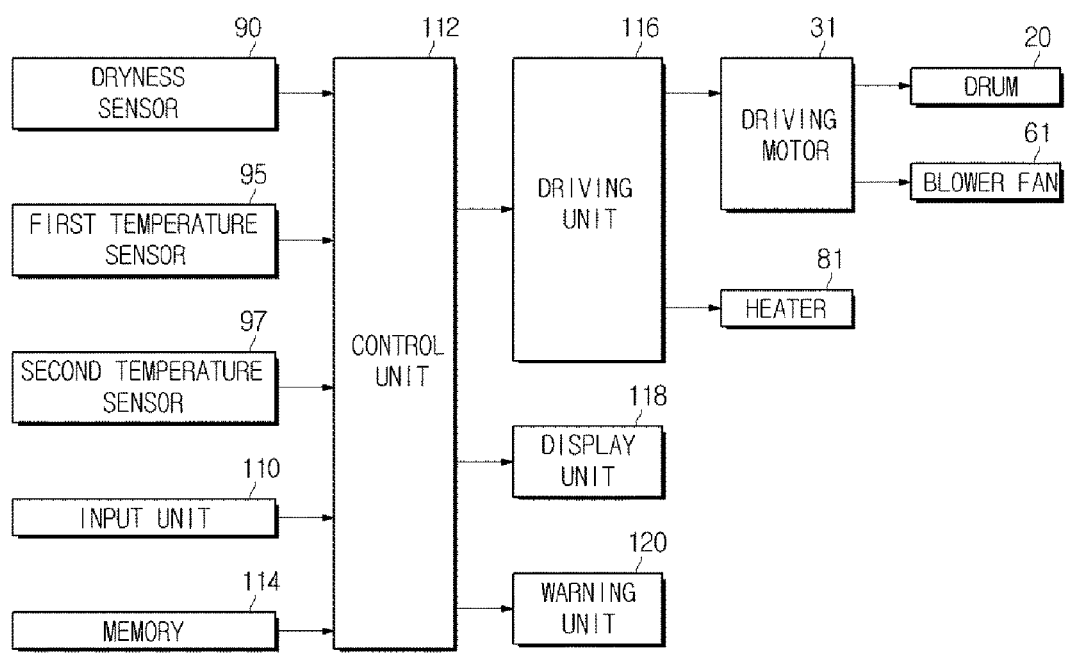
FIG. 4 is a control block diagram of the dryer in accordance with an embodiment of the present disclosure.

FIG. 4 is a control block diagram of the dryer in accordance with an embodiment of the present disclosure.

In FIG. 4, the dryer 1 includes an input unit 110, a control unit 112, a memory 114, a driving unit 116, a display unit 118, and a warming unit 120.

The input unit 110 is configured to input a drying cycle, such as Normal, Towels, Permanent Press, or Delicates, for example, that a user selects, as well as the driving information such as the drying time and the driving command, into the control unit 112, and may include various buttons that are disposed at the control panel 14. The various buttons include a diagnosis cycle button configured to distinguish the degree of a blockage of the exhaust ducts 51, 53, and 57 in a state when the substance is not put into the dryer 1, that is, at the time of the initial installation of the dryer 1, or in a state of a self diagnosis (a blockage diagnosis). The diagnosis cycle button is referred to as a mode entry button configured to perform a blockage diagnosis that may be implemented by simultaneously pressing a lint removal button and a temperature control button for a predetermined period of time, such as approximately 5 seconds, for example.

In addition, at the input unit 110, other than the buttons above, jog dial is provided, so that a drying status, such as half drying or complete drying, may be selected, and also, a change button may separately be provided at the input unit 110 to adjust the drivability and the drying time of the selected drying cycle.

Other than the above, the input unit 110 may be composed of a key, a switch, and a touch pad, and includes any apparatus that generates predetermined data by manipulation such as pressing, contacting, pressurizing, and rotating, for example.

The control unit 112 is referred to as a micro computer configured to control the overall operation of the dryer 1 according to the driving information that is input from the input unit 110, and detects the degree of a blockage of the exhaust ducts 51, 53, and 57 by measuring the temperature of the entry of the drum and the time at the operation time (ON/OFF time) of the thermostat 82. That is, the control unit 112, by using the temperature of the drum and the time during a drying process provided with the substance, distinguishes the degree of a blockage of the exhaust ducts 51, 53, and 57 at each stage level (Level 1, Level 2, Level 3, and Level 0). By referring to FIG. 5 and FIG. 6, the above will be described in detail.

In addition, the control unit 112, even during the initial installation process of the dryer 1 or in a state when the substance is not yet put into the dryer 1, by using a diagnosis algorithm capable of precisely detecting the degree of a blockage of the dryer 1, performs a diagnosis on the suitability of the dryer 1 with respect to the installation environment, or enables a user to use the algorithm above for a purpose of a self diagnosis. For the above, by measuring the temperature of the exit of the drum and the time, the degree of a blockage of the exhaust ducts 51, 53, and 57 is distinguished. That is, the control unit 112, at the time of the initial installation without the substance put into the dryer 1 or at the time of performing a self diagnosis (a blockage diagnosis), by using the temperature of the exit of the drum and the time, the degree of a blockage of the exhaust ducts 51, 53, and 57 is distinguished at each stage level (Level 3, Level 2, Level 1, and Level 0). The above will be described later in detail by referring to FIG. 7A and FIG. 7B.

In addition, the control unit 112 controls the dryer in a way that the degree of a blockage of the exhaust ducts 51, 53, and 57, which is distinguished at each stage level (Level 3, Level 2, Level 1, and Level 0), is displayed, and provides a warning, in the form of a buzzer or sound, for example, at the point in time when the each stage level is distinguished, so that a user may be able to acknowledge the degree of a blockage of the exhaust ducts 51, 53, and 57, which is distinguished at each stage level (Level 3, Level 2, Level 1, and Level 0).

At the memory 114, the configuration information including control data to control the operation of the dryer 1, reference data being used during an operational control of the dryer 1, operational data being generated when the dryer 1 proceeds with a drying cycle, and configuration data being input by the input unit 110 for the dryer 1 to proceed with a drying cycle, the usage information including the number of frequencies that the dryer 1 performs a particular operation as well as model information of the dryer 1, and the malfunction information including the cause and the position of the malfunction at the time a malfunction occurs at the dryer 1, may be stored.

The driving unit 116 drives the driving motor 31 and the heater 81 related to the operation of the dryer 1 according to the driving control signal of the control unit 112.

The display unit 118 is provided at the control panel 14, and displays the operational status of the dryer 1 according to the display control signal of the control unit 112, and also displays the manipulation status of a user by recognizing the information being input through a user interface.

In addition, the display unit 118, in a case of a LCD UI capable of displaying texts, displays a warning text corresponding to the degree of a blockage at each stage level (Level 3, Level 2, Level 1, and Level 0), places an expression of emphasis (colorization, boldfacing, or italicization) on the warning text, and depending on the degree of a blockage, continuously displays the warning message for a predetermined period of time after the completion of a drying process, to indicate the nature of the blockage.

In addition, the display unit 118, in a case of a LED UI, by use of lighting, flashing, or differentiation of the continuation of a display of a warning text at each stage level (Level 3, Level 2, Level 1, and Level 0) depending on the degree of a blockage through a blockage icon, may enable a user to recognize the blockage, and depending on the degree of a blockage, the display unit 118 may display the blockage icon continuously for a predetermined period of time after the completion of a drying process.

The warning unit 120 is provided at the control panel 14, and enables a user to recognize the degree of a blockage by providing a warning in the form of a buzzer or sound, for example, at the point in time when the degree of a blockage of the dryer 1 is being distinguished at each stage level (Level 3, Level 2, Level 1, and Level 0).

Figure 5:
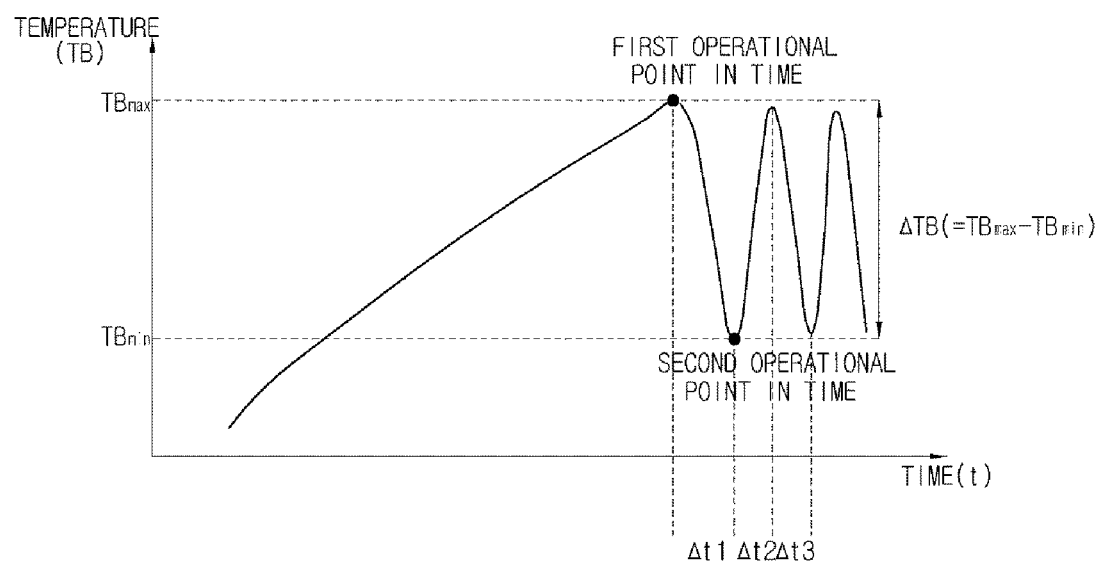
FIG. 5 is a graph showing a profile configured to detect the blockage of the exhaust duct by using the temperature of the entry of the drum at the dryer in accordance with an embodiment of the present disclosure.

FIG. 5 is a graph showing a profile configured to detect a blockage of the exhaust duct by using the temperature of the entry of the drum at the dryer in accordance with an embodiment of the present disclosure.

In FIG. 5, while a drying cycle is in progress, by using the first temperature sensor 95, the temperature of the air being introduced to the drum 20, that is, the temperature at the entry of the drum, is detected. When the exhaust ducts 51, 53, and 57 are blocked due to lint accumulation, the flow of the air being discharged to the outside of the dryer 1 is restricted, and thus the temperature of the heater 81 or the temperature of the air heated by the heater is gradually increased. When the temperature of the heater 81 is increased and reaches a predetermined overheated temperature, the thermostat 82 installed at a side surface of or near the heater 81 is turned OFF to block power from being applied to the heater 81, and thereby the overheating of the heater 81 is prevented. At this time, the control unit 112 measures the temperature 'TB1' (described in FIG. 5 as 'FIRST OPERATIONAL POINT IN TIME') at the entry of the drum and the time 't1' detected by the first temperature sensor 95 at the point in time when the thermostat 82 is turned OFF at the first time (that is, the point in time when the heater is turned OFF at the first time, and the point in time as such is hereinafter referred to as the first operational point in time).

As the above, when the power being applied to the heater 81 is blocked while the thermostat 82 is turned OFF, the temperature of the heater 81 is decreased. When the temperature of the heater 81 is decreased below the overheating temperature, the thermostat 82 is turned ON again, and thus the power is applied to the heater 81, and thereby the heater 81 radiates heat. At this time, the control unit 112 measures the temperature 'TB2' (described in FIG. 5 as 'SECOND OPERATIONAL POINT IN TIME') of the entry of the drum and the time 't2' detected by the first temperature sensor 95 at the point in time when the thermostat 82 is turned ON (that is, the point in time when the heater is turned OFF at the first time and then turned ON, and the point in time as such is hereinafter referred to as the second operational point in time).

Meanwhile, the first operational point in time is determined as the point in time when the inclination of the temperature change of the temperature 'TB1' of the entry of the drum, which is detected by the first temperature sensor 95, is changed from (+) to (−). The control unit 112, in order to further precisely determine the first operational point in time, determines whether the rate of temperature change of the temperature 'TB1' of the entry of the drum, that is, the amount of temperature change that is changed during a predetermined period of time, or in other words, the factor capable of detecting a blockage of the exhaust duct, exceeds a reference rate of change, that is, a reference rate of temperature change capable of detecting a blockage of the exhaust duct. In a case when the rate of the temperature change of the temperature 'TB1' of the entry of the drum exceeds the reference rate of change as a result of the determination above, the point in time when the inclination of the temperature change of the temperature 'TB1' of the entry of the drum is changed from (+) to (−) is determined to be the first operational point in time. The temperature 'TB1' of the entry of the drum is provided with the maximum value 'TBmax'.

In addition, the second operational point in time is determined as the point in time when the inclination of the temperature change of the temperature 'TB2' of the entry of the drum detected by the first temperature sensor 95 is changed from (−) to (+). The control unit 112, in order to further precisely determine the second operational point in time, determines whether the rate of temperature change of the temperature 'TB2' of the entry of the drum exceeds a reference rate of change. In a case when the rate of the temperature change of the temperature 'TB2' of the entry of the drum exceeds the reference rate of change as a result of the determination above, the point in time when the inclination of the temperature change of the temperature 'TB2' of the entry of the drum is changed from (−) to (+) is determined to be the second operational point in time. At this time, the temperature 'TB2' of the entry of the drum is provided with the minimum value 'TBmin'.

The first operational point in time and the second operational point in time are determined as in the case when the rate of temperature change exceeds the reference rate of change, so that the blockage of the exhaust ducts 51, 53, and 57 may be further precisely detected. In a case when a drying cycle is performed when the exhaust ducts 51, 53, and 57 are less than or equal to approximately 50% blocked, for example, the temperature 'TB' of the entry of the drum is not radically changed, and thus the rate of temperature change of the entry of the drum does not exceed the reference rate of change. On the contrary, in a case when a drying cycle is performed when the exhaust ducts 51, 53, and 57 are more than 50% blocked, for example, the temperature 'TB' of the entry of the drum is radically changed, and thus the rate of temperature change of the entry of the drum exceeds the reference rate of change. However, the disclosure is not limited to the above percentage. For example, the temperature may be radically changed when the exhaust ducts are 25% blocked, for example, depending on the particular configuration of the exhaust ducts.

When the first operational point in time and the second operational point in time are determined, the control unit 112 calculates the difference ('ΔT'='TB1'−'TB2', and hereinafter referred to as the temperature difference) between the maximum temperature 'TB1' of the first operational point in time and the minimum temperature 'TB2' of the second operational point in time, and also calculates the difference ('Δt'='t1'−'t2', and hereinafter referred to as the time difference) between the time 't1' of the first operational point in time and the time 't2' of the second operational point in time. By using the temperature difference 'ΔT' and the time difference 'Δt' that are calculated, the degree of a blockage of the exhaust ducts 51, 53, and 57 is detected, and the degree of a blockage of the exhaust ducts 51, 53, and 57 is displayed with the display unit 118 at each stage level.

Of course, at the control unit 112, a table configured to calculate the degree of a blockage of the exhaust ducts 51, 53, and 57 using the temperature difference 'ΔT' and the time difference 'Δt' is stored, and a timer configured to count the duration of the time of a drying cycle is included.

Hereinafter, an operational process and an effect of the dryer and the blockage detection method in accordance with an embodiment of the present disclosure will be described.

Figure 6:
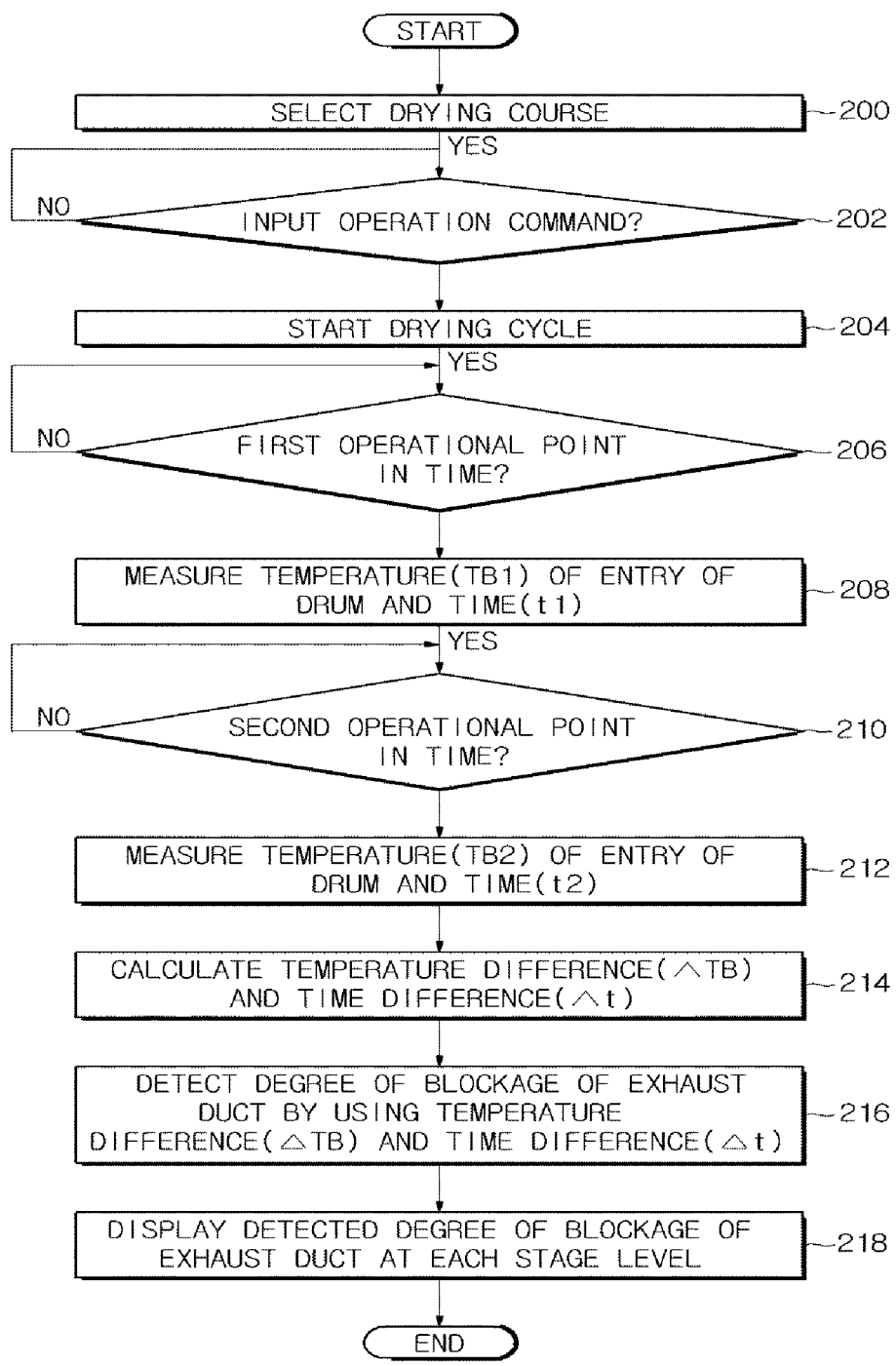
FIG. 6 is a flow chart showing a control algorithm configured to detect the blockage of the exhaust duct by using the temperature of the entry of the drum at the dryer in accordance with an embodiment of the present disclosure.
Figure 9:
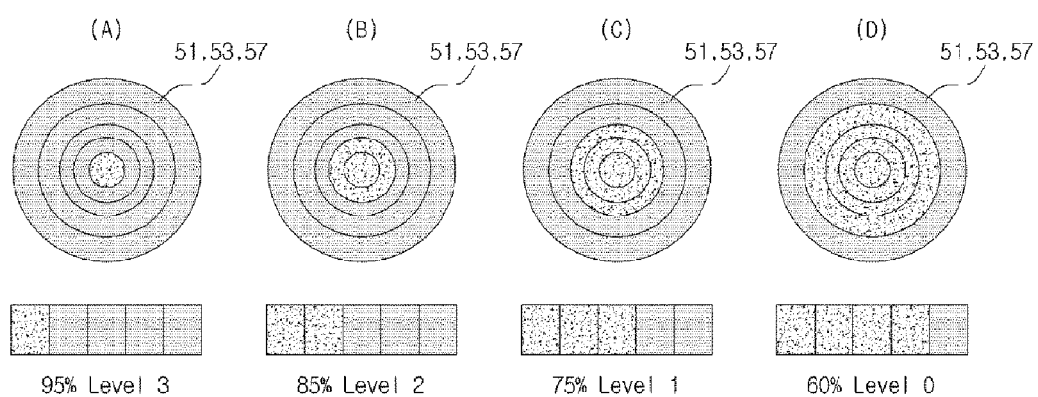
FIG. 9 part (A), part (B), part (C), and part (D) show the degree of a blockage of the exhaust duct at the dryer in accordance with an embodiment of the present disclosure.

FIG. 6 is a flow chart showing a control algorithm configured to detect the blockage of the exhaust duct by using the temperature of the entry of the drum at the dryer in accordance with an embodiment of the present disclosure, and FIG. 9 is a drawing showing the degree of a blockage of the exhaust duct at the dryer in accordance with an embodiment of the present disclosure.

The control algorithm on FIG. 6 includes the distinguishing of the degree of a blockage of the exhaust ducts 51, 53, and 57 at each stage level (Level 3, Level 2, Level 1, and Level 0) by using the temperature of the entry of the drum and the time during a drying cycle while provided with the substance.

In FIG. 6, when a user puts the substance to be dried into the drum 20 and selects a drying cycle (a plurality of drying cycles includes the Normal drying cycle, the Towels drying cycle, the Permanent Press drying cycle, or the Delicates drying cycle) according to the type of the substance (operation 200), and the cycle information that the user selects is input into the control unit 112 through the input unit 110.

Thus, the control unit 112 proceeds with the drying cycle according to the cycle information that is input from the input unit 110, but first, the control unit 112 determines whether an operational command is input (operation 202).

When the operational command is input as a result of the determination from the stage 202, the control unit 112 operates the driving motor 31 and the heater 81 through the driving unit 116 to start the drying cycle (operation 204).

When the drying cycle is started, according to the operation of the driving motor 31, the drum 20 is rotated to rotate the substance inside the drum 20, and according to the operation of the driving motor 31, the blower fan 61 is also rotated in an interlocked manner, and thus air flows inside the dryer 1.

At this time, the heater 81 applies heat to the air that is passed through the hot air duct 70 in order to apply heat to the air that flows inside the dryer 1. The hot air that is heated while passing through the hot air duct 70 is introduced to the inside of the drum 20 through the hot air supplying unit 40, and the hot air that is introduced to the inside of the drum 20 is contacted at the rotating substance that repeats the ascension and the descension at the inside of the drum 20, and through a drying operation to evaporate moisture contained in the substance, the substance is dried.

During the drying operation, the hot air that is passed through the drum 20 is guided along the front exhaust duct 51 and the rear exhaust duct 53, and is discharged to an outside location through the outside exhaust duct 57. In the process described above, the lint generated from the substance is included in the hot air, and is discharged. The lint being discharged at this time is filtered at the filter member 55 installed at the front exhaust duct 51, and is not discharged to an outside location.

However, in a case when using the dryer 1 for a long period of time, the lint that is not filtered at the filter member 55 is accumulated at the exhaust ducts 51, 53, and 57, When the lint accumulates at the exhaust ducts 51, 53, and 57, the exhaust ducts 51, 53, and 57 are gradually blocked, and thus the point in time, in which the flow of the air discharged to the outside of the dryer 1 is restricted, is generated. The interruption of the flow of the air by the blockage of the exhaust ducts 51, 53, and 57 reduces the drying performance of the dryer 1, and also increases the power consumption of the draft fan 61 while increasing noise.

In addition, as a result of the overheating of the dryer 1 from the blockage of the exhaust ducts 51, 53, and 57, an outbreak of fire may take place.

Thus, in accordance with an embodiment of the present disclosure, in order to detect the point in time when the lint accumulates at the exhaust ducts 51, 53, and 57 and blocks the exhaust ducts 51, 53, and 57, the temperature of the air being introduced into the drum 20, that is, the temperature of the entry of the drum, is detected by using the first temperature sensor 95 while the drying cycle is in progress.

In a case when the lint accumulates at the exhaust ducts 51, 53, and 57 and blocks the exhaust ducts 51, 53, and 57, the flow of the air that is discharged to an outside the dryer 1 is restricted, and thus the temperature of the heater 81, or the temperature of the air that is heated by the heater 81, is rapidly increased. When the temperature of the heater 81 reaches a predetermined overheating temperature, the thermostat 82 installed at a side surface of or near the heater 81 is turned OFF, so that power is not applied to the heater 81, and thus the overheating of the heater 81 is prevented.

Thus, the control unit 112 determines (operation 206) whether the current time corresponds to the first operational point in time when the thermostat 82 is turned OFF, that is, the point in time when the heater is turned OFF at the first time, and when the current time is determined as the first operational point in time, as illustrated on FIG. 5, the temperature 'TB1' of the entry of the drum and the time 't1' at the first operational point in time are measured (operation 208).

The control unit 112, in a case when the rate of temperature change of the temperature 'TB1' of the entry of the drum exceeds the reference rate of change, determines the point in time, in which the inclination of the temperature change of the temperature 'TB1' of the entry of the drum is changed from (+) to (−), as the first operational point in time. The temperature 'TB1' of the entry of the drum at this time is provided with the maximum value 'TBMax'.

Meanwhile, the point in time when the heater 81 is turned OFF at the first time, that is, the point in time when the inclination of the temperature change of the temperature 'TB1' of the entry of the drum is changed from (+) to (−), may be generated under the control condition of the control unit 112, other than under the condition of the mechanical condition when the thermostat 82 is turned OFF. The control condition of the control unit 112 includes the controlling of the drying operation by turning the operation of the heater 81 ON/OFF according to the amount of temperature change or the amount of moisture change of the air at an inside the drum 20, and is different from the turning the heater 81 OFF as a result of the blockage of the exhaust ducts 51, 53, and 57.

Thus, the control unit 112, by determining whether the current point in time is when the heater 81 is turned OFF at the first time according to the mechanical operation of the thermostat 82 as a result of the blockage of the exhaust ducts 51, 53, and 57, or whether the point in time is when the heater 81 is turned OFF at the first time under the normal control condition, determines the first operational point in time.

As the above, when the power applied to the heater 81 is blocked while the thermostat 82 is turned OFF, the temperature of the heater 81 is decreased. When the temperature of the heater 81 is decreased below the overheating temperature, the thermostat 82 is turned ON again, and thus the power is applied to the heater 81, and thereby the heater 81 radiates heat.

Thus, the control unit 112 determines whether the second operational point in time when the thermostat 82 is turned ON, that is, the point in time when the heater is turned OFF at the first time and then turned ON (operation 210), and when the point in time as such is determined as the second operational point in time, as illustrated on FIG. 5, the temperature 'TB2' of the entry of the drum and the time 't2' at the second operational point in time are measured (operation 212).

The control unit 112, in a case when the rate of temperature change of the temperature 'TB2' of the entry of the drum exceeds the reference rate of change, determines the point in time, in which the inclination of the temperature change of the temperature 'TB2' of the entry of the drum is changed from (−) to (+), as the second operational point in time. The temperature 'TB2' of the entry of the drum at this time is provided with the minimum value TBMin'.

When the first operational point in time and the second operational point in time are determined, the control unit 112 calculates the temperature difference ('ΔT'='TB1'−'TB2') between the maximum temperature 'TB1' of the first operational point in time and the minimum temperature 'TB2' of the second operational point in time, and also calculates the time difference ('Δt'='t1'−'t2') between the time 't1' of the first operational point in time and the time 't2' of the second operational point in time (operation 214).

Then, the control unit 112, by using the temperature difference 'ΔT' and the time difference 'Δt' that are calculated, detects the degree of a blockage of the exhaust ducts 51, 53, and 57 (operation 216). For the above, at the control unit 112, a table configured to calculate the degree of a blockage of the exhaust ducts 51, 53, and 57 using the temperature difference 'ΔT' and the time difference 'Δt' is stored, and according to the stored data, the degree of a blockage of the exhaust ducts 51, 53, and 57, as illustrated on FIG. 9, may be detected at each stage level (Level 3, Level 2, Level 1, and Level 0). The detected degree of blockage of the exhaust ducts at each stage level may then be displayed (operation 218).

Figure 7A:
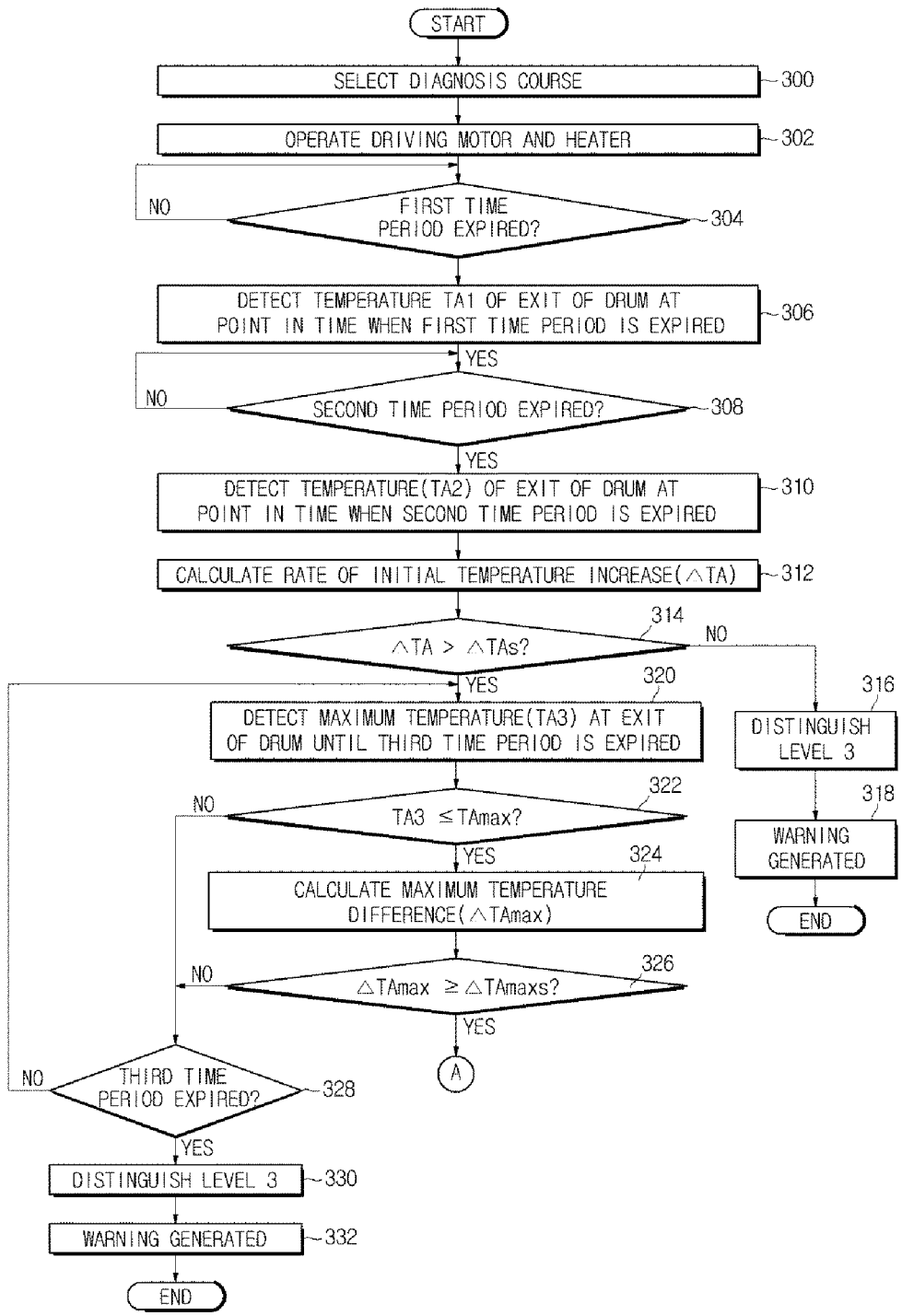
FIGS. 7A and 7B are flow charts showing a control algorithm configured to diagnose the blockage of the exhaust duct by using the temperature of the entry of the drum at the dryer in accordance with an embodiment of the present disclosure.
Figure 7B:
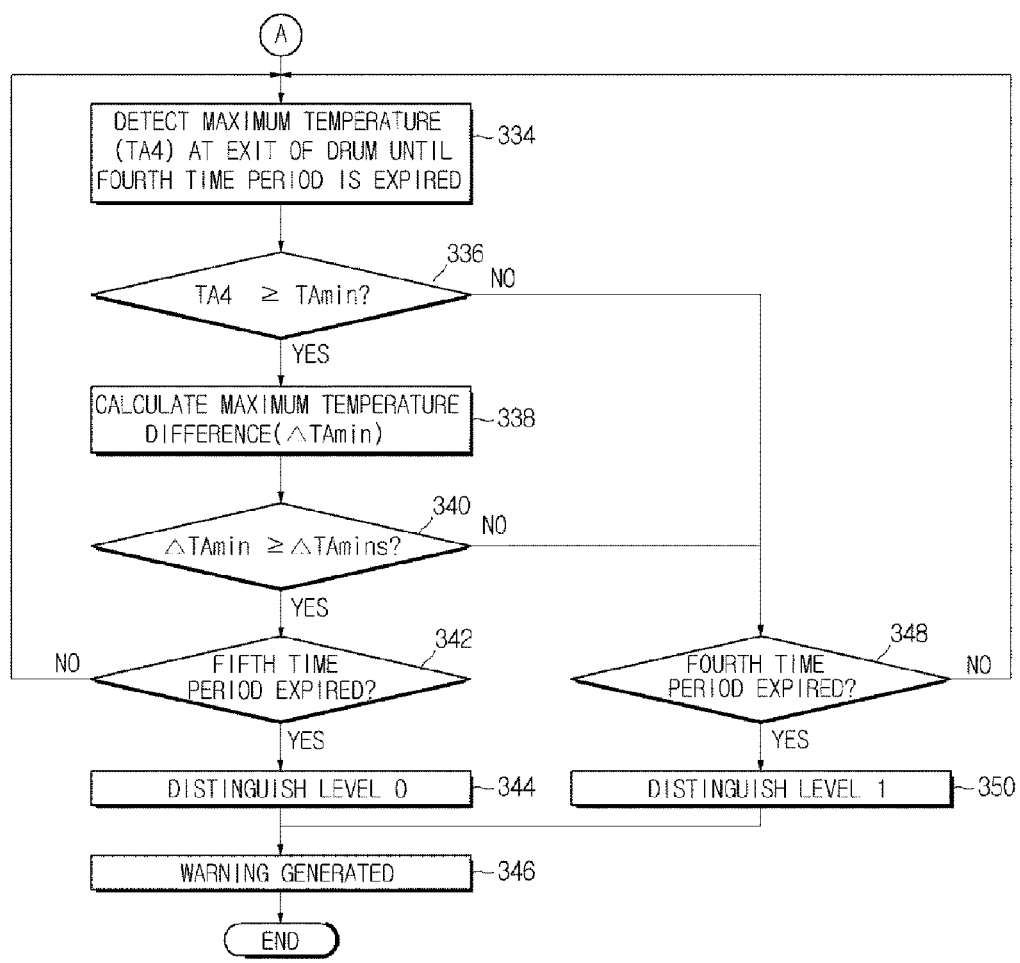
Figure 8:
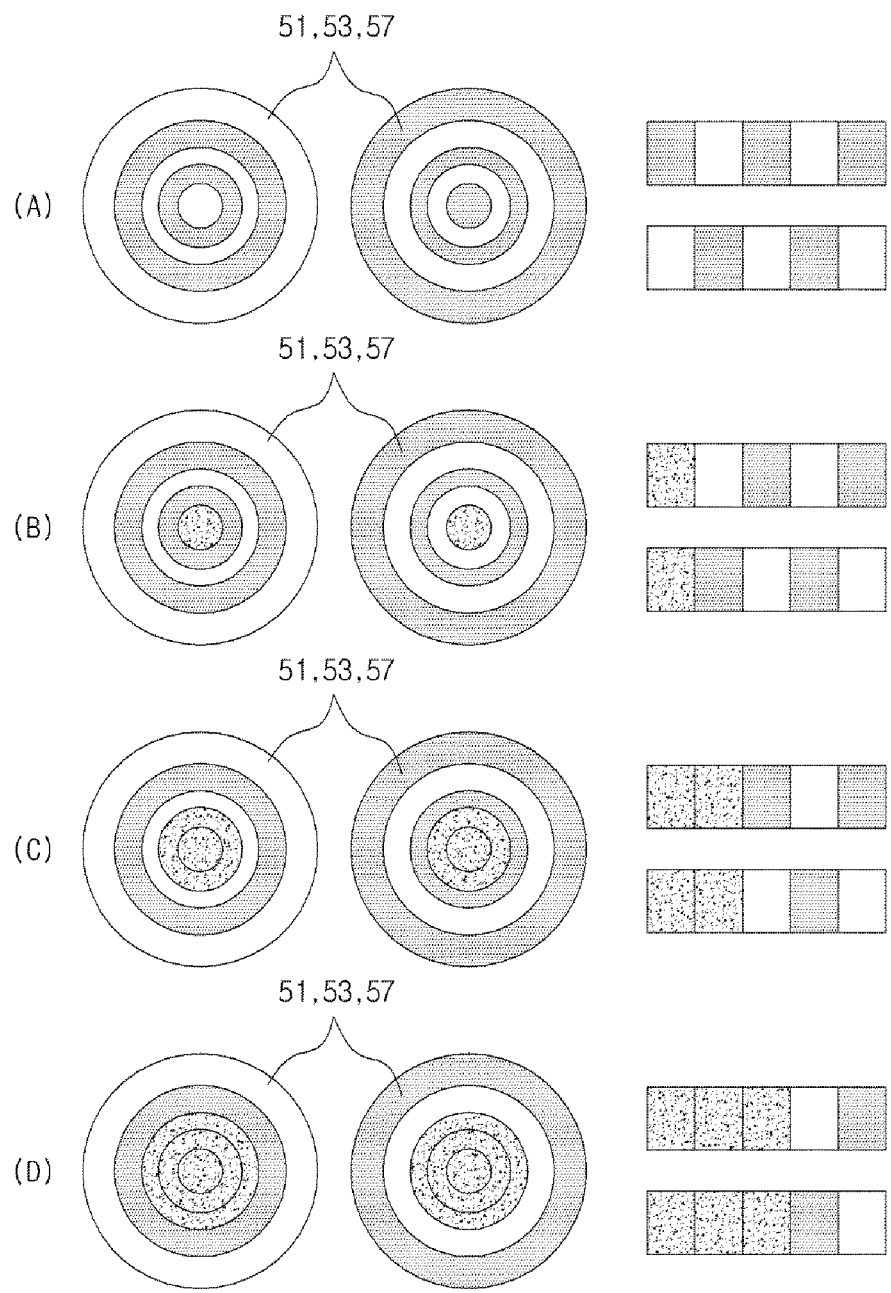
FIG. 8 part (A), part (B), part (C), and part (D) show a process of diagnosing a blockage of the exhaust duct by using the temperature of the exit of the drum at the dryer in accordance with an embodiment of the present disclosure.

FIGS. 7A and 7B are flow charts showing the control algorithm configured to detect the blockage of the exhaust duct by using the temperature of the exit of the drum at the dryer in accordance with an embodiment of the present disclosure, FIG. 8 is a drawing showing a process of diagnosing a blockage of the exhaust duct by using the temperature of the exit of the drum at the dryer in accordance with an embodiment of the present disclosure, and FIG. 9 is a drawing showing the degree of a blockage of the exhaust duct at the dryer in accordance with an embodiment of the present disclosure.

The control algorithm on FIG. 7A and FIG. 7B includes the distinguishing of the degree of a blockage of the exhaust ducts 51, 53, and 57 at each stage level (Level 3, Level 2, Level 1, and Level 0) by using the temperature of the exit of the drum and the time at the time of an initial installation of the dryer 1 or during a self diagnosis of the dryer 1 while provided without the substance.

In FIG. 7A and FIG. 7B, when a user or an installation worker selects the diagnosis cycle button provided at the control panel 14 (operation 300), the selection information of the diagnosis cycle button is input into the control unit 112 through the input unit 110. The diagnosis cycle button may be implemented by simultaneously pressing a lint removal button and a temperature control button for a predetermined period of time, for example, approximately 5 seconds, and other than the above, the diagnosis cycle button may be implemented by providing a separate button.

Thus, the control unit 112, according to the diagnosis cycle information that is input from the input unit 110, operates the driving motor 31 and the heater 81 through the driving unit 116 (operation 302).

When the driving motor 31 is operated, the drum 20 without the substance and the blower fan 61 are rotated, and thus air starts to flow inside the dryer 1.

At this time, the heater 81 applies the heat that is passed through the hot air duct 70 to apply heat to the air that flows inside the dryer 1. The air that is heated while passing through the hot air duct 70 is introduced to the inside of the drum 20 through the hot air supplying unit 40, and the hot air that is passed through the drum 20 is guided along the front exhaust duct 51 and the rear exhaust duct 53, and is discharged to an outside location through the outside exhaust duct 57. In the process described above, if the exhaust ducts 51, 53, and 57 are blocked, as time goes by, the temperature of the air, that is, the temperature of the exit of the drum, that is passed through the drum 20 is changed. At this time, the change of the temperature of the exit of the drum is shown differently at each stage level according to the degree of a blockage of the exhaust ducts 51, 53, and 57.

In accordance with an embodiment of the present disclosure, the degree of blockage of the exhaust ducts 51, 53 and 57 shown differently at each stage level is differentiated by use of the temperature of air passed through the drum 20, that is, the temperature of the exit of the drum while the diagnosis cycle is in progress.

Meanwhile, in accordance with an embodiment of the present disclosure, the detecting of the temperature of the air that is passed through the drum 20 is described as being performed by operating the driving motor 31 and the heater 81, as an example, but the present disclosure is not limited hereto, and by operating only the heater 81, the temperature of the air that is passed through the drum 20 may be able to be detected.

The control unit 112, by counting the duration of the time that the driving motor 31 and the heater 81 are being operated, determines whether a first time period 'tA1', which is set as approximately 30 seconds, for example, has expired (operation 304).

When the first time period 'tA1' has expired as a result of the determination from the stage 304, the control unit 112, by using the second temperature sensor 97, detects the temperature 'TA1' of the exit of the drum at the point in time when the first time period 'tA1' has expired (operation 306).

Then, the control unit 112 continues with the counting of the time, and determines whether a second period of time "tA2", which is set as approximately 60 seconds, for example, has expired (operation 308).

When the second time period 'tA2' has expired as a result of the determination from the stage 308, the control unit 112, by using the second temperature sensor 97, detects the temperature 'TA2' of the exit of the drum at the point in time when the first time period 'tA2' has expired (operation 310).

When the temperature 'TA1' of the exit of the drum at the time of the expiration of the first time period 'tA1' and the temperature 'TA2' of the exit of the drum at the time of the expiration of the second time period 'tA2' are detected, the control unit 112 calculates the rate of initial temperature increase $\{`\Delta TA'=(TA2-TA1)/(tA2-tA1)\}$ of the temperature 'TA1' of the exit of the drum at the time of the expiration of the first time period 'tA1' and the temperature 'TA2' of the exit of the drum at the time of the expiration of the second time period 'tA2' (operation 312).

Then, the control unit 112 determines whether the calculated rate of initial temperature increase 'ΔTA' is larger than a predetermined rate of reference temperature increase 'ΔTAs', which is within approximately 1° C., for example, and is referred to as the rate of initial temperature increase of a section that should be cleaned due to the severe degree of a blockage of the exhaust ducts (operation 314).

When the rate of initial temperature increase 'ΔTA' is not larger than the predetermined rate of reference temperature increase 'ΔTAs' as a result of the determination from the operation 314, the control unit 112 distinguishes the degree of a blockage of the exhaust ducts 51, 53, and 57 as Level 3, which represents approximately 95% or above, for example, in terms of the degree of the blockage (operation 316), and provides a warning through the warning unit 120 in the form of a buzzer or sound to indicate the above (operation 318).

At this time, the control unit 112, until the degree of a blockage of the exhaust ducts 51, 53, and 57 is determined to be at Level 3, displays the blockage diagnosis process of the exhaust ducts 51, 53, and 57, as illustrated in part (A) of FIG. 8 through the display unit 118. Then, after finally distinguishing that the degree of a blockage of the exhaust ducts 51, 53, and 57 is at Level 3, in order for a user to acknowledge that the degree of a blockage of the exhaust ducts 51, 53, and 57 is at Level 3, as illustrated on FIG. 9 part (A), displays the degree of a blockage of the exhaust ducts 5, 53 and 57 through the display unit 118, and ends the blockage diagnosis process of the degree of a blockage of the exhaust ducts 51, 53, and 57.

Meanwhile, when the rate of initial temperature increase 'ΔTA' is larger than the predetermined rate of reference temperature increase 'ΔTAs' as a result of the determination from the operation 314, the control unit 112 determines that the degree of a blockage of the exhaust ducts 51, 53, and 57 is not severe, and detects the temperature 'TA' of the exit of the drum by using the second temperature sensor 97 until a third time period, which is approximately 140 seconds, for example, has expired, so that the blockage diagnosis process of the degree of a blockage of the exhaust ducts 51, 53, and 57 is continued. Then, the control unit 112 detects a maximum temperature 'TA3' that satisfies a particular condition among the temperatures 'TA' of the exit of the drum that are detected until the third time period, which is approximately 140 seconds, for example, has expired (operation 320).

Thus, the control unit 112 determines whether the detected maximum temperature 'TA3' of the exit of the drum is below the predetermined maximum reference temperature 'TAmax', which is the maximum temperature at the point in time when the heater is turned OFF at the first time as the thermostat is mechanically operated as a result of a blockage of the exhaust duct (operation 322).

When the maximum temperature 'TA3' of the exit of the drum is below the maximum reference temperature 'TAmax' as a result of the determination from the operation 322, the control unit 112 calculates a maximum temperature difference ('ΔTAmax'='TAmax'−'TA3') between the maximum temperature 'TA3' of the exit of the drum and the maximum reference temperature 'TAmax' (operation 324).

Then, the control unit 112 determines whether the maximum temperature difference 'ΔTAmax' is larger than a predetermined reference temperature difference 'ΔTAmaxs', which is approximately 2° C., for example, and is referred to as the reference temperature difference of a section that is needed to be provided with a diagnosis due to the severe degree of a blockage of the exhaust ducts (operation 326).

When the maximum temperature difference 'ΔTAmax' is not larger than the reference temperature difference 'ΔTAmaxs' as a result of the determination from the operation 326, the control unit 112 determines that the degree of a blockage of the exhaust ducts 51, 53, and 57 is severe, and determines whether the third time period has expired (operation 328).

If the third time period has not expired as a result of the determination from the operation 328, the control unit 112 returns to the operation 320 and proceeds with the operations that follow.

When the third time period has expired as a result of the determination from the stage 328, the control unit 112 distinguishes the degree of a blockage of the exhaust ducts 51, 53, and 57 is at Level 2, which represents approximately 85% or above, for example, in terms of the degree of the blockage (operation 330), and provides a warning through the warning unit 120 in the form of a buzzer or sound to indicate the above (operation 332).

At this time, the control unit 112, until the degree of a blockage of the exhaust ducts 51, 53, and 57 is determined to be at Level 2, displays the blockage diagnosis process of the exhaust ducts 51, 53, and 57, as illustrated in part (B) of FIG. 8 through the display unit 118. Then, after finally distinguishing that the degree of a blockage of the exhaust ducts 51, 53, and 57 is at Level 2, in order for a user to acknowledge that the degree of a blockage of the exhaust ducts 51, 53, and 57 is at Level 2, as illustrated in part (B) of FIG. 9, displays the degree of blockage of the exhaust ducts 51, 53 and 57 through the display unit 118, and ends the blockage diagnosis process of the degree of a blockage of the exhaust ducts 51, 53, and 57.

In addition, if the maximum temperature 'TA3' of the exit of the drum is not below the maximum reference temperature 'TAmax' as a result of the determination from the operation 322, the control unit 112 determines that the degree of a blockage of the exhaust ducts 51, 53, and 57 is severe, and proceeds to the operation 328 to proceed with the operations that follows.

Meanwhile, when the maximum reference temperature difference 'ΔTAmax' is larger than the reference temperature difference 'ΔTAmaxs' as a result of the determination from the operation 326, the control unit 112 determines that the degree of a blockage of the exhaust ducts 51, 53, and 57 is not severe, and detects the temperature 'TA' of the exit of the drum by using the second temperature sensor 97 until a fourth time period, which is approximately 160 seconds, for example, has expired, so that the blockage diagnosis process of the degree of a blockage of the exhaust ducts 51, 53, and 57 is continued. Then, the control unit 112 detects a minimum temperature 'TA4' that satisfies a predetermined condition among the temperatures 'TA' of the exit of the drum that are detected until the fourth time period, which is approximately 160 seconds, for example, has expired (operation 334).

Thus, the control unit 112 determines whether the detected minimum temperature 'TA4' of the exit of the drum is above a predetermined minimum reference temperature 'TAmin', which is the minimum temperature at the point in time when the heater is turned ON as the thermostat is turned ON after the heater is turned OFF at the first time (operation 336).

When the minimum temperature 'TA4' of the exit of the drum is above the minimum reference temperature 'TAmin' as a result of the determination from the operation 336, the control unit 112 calculates a minimum temperature difference (ΔTAmin=TA4−TAmin) between the minimum temperature 'TA4' of the exit of the drum and the minimum reference temperature 'TAmin' (operation 338).

Then, the control unit 112 determines whether the minimum temperature difference 'ΔTAmin' is larger than a predetermined reference temperature difference 'ΔTAmins', which is approximately 2° C., for example, and is referred to as a reference temperature difference of a section that should be cleaned at the filter member while the degree of a blockage of the exhaust ducts is not severe (operation 340).

When the minimum temperature difference 'ΔTAmin' is not larger than the reference temperature difference 'ΔTAmins' as a result of the determination from the operation 340, the control unit 112 determines that the degree of a blockage of the exhaust ducts 51, 53, and 57 is not severe but that the section should be cleaned at the filter member 55, and determines whether a fourth time period is expired (operation 348).

If the fourth time period has not expired as a result of the determination from the operation 348, the control unit 112 returns to the operation 334 and proceeds with the operations that follow.

Meanwhile, when the fourth time period has expired as a result of the determination from the stage 348, the control unit 112 distinguishes the degree of a blockage of the exhaust ducts 51, 53, and 57 as Level 1, which represents approximately 75% or above, for example, in terms of the degree of the blockage (operation 350), and provides a warning through the warning unit 120 in the form of a buzzer or sound to indicate the above (operation 346).

At this time, the control unit 112, until the degree of a blockage of the exhaust ducts 51, 53, and 57 is determined to be at Level 1, displays the blockage diagnosis process of the exhaust ducts 51, 53, and 57, as illustrated on FIG. 8 part (C) through the display unit 118. Then, after finally distinguishing that the degree of a blockage of the exhaust ducts 51, 53, and 57 is at Level 1, in order for a user to acknowledge that the degree of a blockage of the exhaust ducts 51, 53, and 57 is at Level 1, as illustrated on FIG. 9 part (C), displays the above through the display unit 118, and ends the blockage diagnosis process of the degree of a blockage of the exhaust ducts 51, 53, and 57.

In addition, if the minimum temperature 'TA4' of the exit of the drum is not below the minimum reference temperature 'TAmin' as a result of the determination from the operation 336, the control unit 112 determines that the degree of a blockage of the exhaust ducts 51, 53, and 57 is not severe but that the section should be cleaned at the filter member 55, and proceeds to the operation 348 to proceed with the operations that follow.

Meanwhile, when a minimum temperature difference 'ΔTAmin' is larger than a reference temperature difference 'ΔTAmins' as a result of the determination from operation 340, the control unit 112 determines that the degree of a blockage of the exhaust ducts 51, 53, and 57 is in a satisfactory status, and determines whether a fifth time period, which is approximately 180 seconds, for example, has expired (operation 342).

If the fifth time period has not expired as a result of the determination from the stage 342, the control unit 112 returns to the stage 334 and proceeds with the operations that follow.

Meanwhile, when the fifth time period has expired as a result of the determination from the operation 342, the control unit 112 distinguishes the degree of a blockage of the exhaust ducts 51, 53, and 57 as Level 0, which represents approximately 60% or above, for example, in terms of the degree of the blockage (operation 344), and provides a warning through the warning unit 120 in the form of a buzzer or sound to indicate the above (operation 346).

At this time, the control unit 112, until the degree of a blockage of the exhaust ducts 51, 53, and 57 is determined to be at Level 0, displays the blockage diagnosis process of the exhaust ducts 51, 53, and 57, as illustrated in part (D) of FIG. 8, through the display unit 118. Then, after finally distinguishing that the degree of a blockage of the exhaust ducts 51, 53, and 57 is at Level 0, in order for a user to acknowledge that the degree of a blockage of the exhaust ducts 51, 53, and 57 is at Level 0, as illustrated in part (D) of FIG. 9, displays the above through the display unit 118, and ends the blockage diagnosis process of the degree of a blockage of the exhaust ducts 51, 53, and 57.

FIG. 9 is a drawing showing the degree of a blockage of the exhaust duct at the dryer in accordance with an embodiment of the present disclosure.

Part (A) of FIG. 9 shows Level 3, which represents approximately 95% or above in terms of the degree of a blockage of the exhaust ducts 51, 53, and 57. Level 3 is referred to as the section that should be cleaned, as the degree of a blockage of the exhaust ducts is severe.

Part (B) of FIG. 9 shows Level 2, which represents approximately 85% or above in terms of the degree of a blockage of the exhaust ducts 51, 53, and 57. Level 2 is referred to the section that should be cleaned at the filter member 55 and the degree of a blockage of the exhaust ducts is severe. Level 2 is referred to as the section that should be provided with a blockage diagnosis of the exhaust ducts 51, 53, and 57.

Part (C) of FIG. 9 shows Level 1, which represents approximately 75% or above in terms of the degree of a blockage of the exhaust ducts 51, 53, and 57. Level 1, as same as Level 2, is referred to as the section that should be cleaned at the filter member 55, but the degree of a blockage of the exhaust ducts is not severe. When the degree of a blockage of the exhaust ducts 51, 53, and 57 is still detected as Level 1 after the cleaning of the filter member 55, a blockage diagnosis of the exhaust ducts 51, 53, and 57 is needed.

Part (D) of FIG. 9 shows Level 0, which represents approximately 60% or above in terms of the degree of a blockage of the exhaust ducts 51, 53, and 57. Level 0 is referred to as the section in which the degree of a blockage of the exhaust ducts 51, 53, and 57 is satisfactory, and only the checking of the filter member 55 is needed.

Then, the control unit 112, as illustrated on part (A) to part (D) of FIG. 9, displays the degree of a blockage of the exhaust ducts 51, 53, and 57 at each stage level (Level 3 to Level 0) through the display unit 118.

Thus, a user may be able to take a proper action in a swift manner according to the degree of a blockage of the exhaust ducts 51, 53, and 57, which is displayed at each stage level (Level 3 to Level 0) through the display unit 118.

As for a method of displaying the degree of a blockage of the exhaust ducts 51, 53, and 57 at each stage level (Level 3 to Level 0) through the display unit 118, the displaying as such may be made appropriately depending on a LCD or a LED.

For example, in a case of a LCD UI capable of displaying texts, differently displays a warning text according to the degree of a blockage at each stage level, places an expression of emphasis (colorization, boldfacing, or italicization) on the warning text, and depending on the degree of a blockage, continuously displays the warning message for a predetermined period of time, even after the completion of a drying process to indicate the details of the blockage.

In addition, in a case of a LED UI, by using the lighting or flashing of a blockage icon, or the differentiating of the continuation of a display of a blockage icon depending on each stage level (Level 3, Level 2, Level 1, and Level 0)

depending on the degree of a blockage so that a user may be able to recognize the blockage, and depending on the degree of a blockage, the display unit 118 may have the warning message be continuously operated for a predetermined period of time even after the completion of a drying process to indicate the nature of the blockage.

Figure 10:
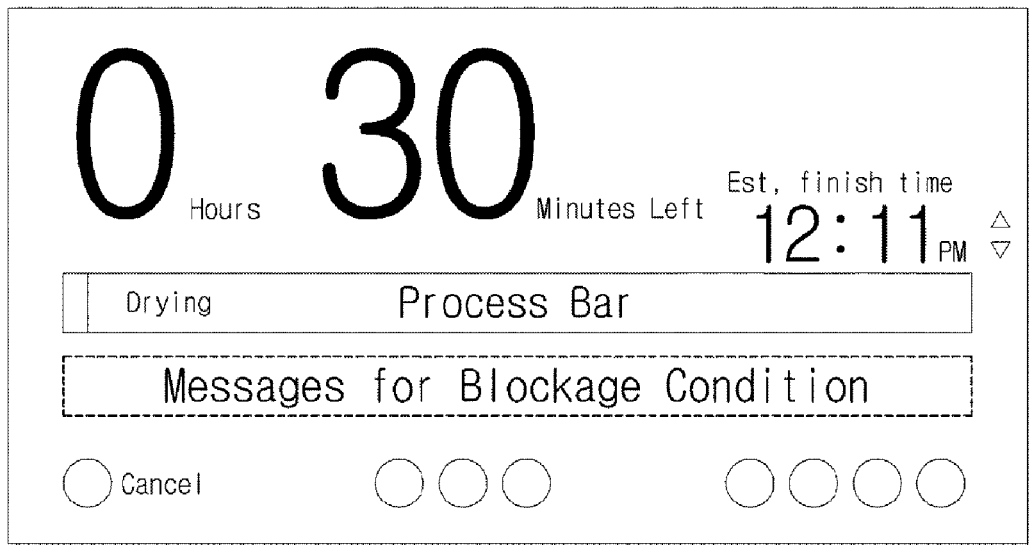
FIG. 10 is a drawing showing an example of a screen configured to display the degree of a blockage of the exhaust duct at the dryer in accordance with an embodiment of the present disclosure.

FIG. 10 is a drawing showing an example of a screen configured to display the degree of a blockage of the exhaust duct at the dryer in accordance with an embodiment of the present disclosure.

On FIG. 10, in a case of a LCD capable of displaying text, the degree of a blockage of the exhaust ducts 51, 53, and 55 is displayed in the form of a message text at a portion that is displayed in a dotted line.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A dryer, comprising:
a drum to accommodate a substance to be dried;
a temperature sensor to detect a temperature at an entry of hot air into the drum;
a heater to supply the hot air to the inside of the drum;
an exhaust duct to discharge the hot air passed through the drum;
a thermostat to control power applied to the heater while operating according to a temperature of the heater; and
a control unit configured to detect a degree of a blockage of the exhaust duct based on the detected temperature at the entry of hot air into the drum and an operation of the thermostat,
wherein the temperature sensor is a thermistor to detect the temperature of the hot air being introduced to the inside of the drum,
wherein the control unit, when a rate of temperature change of the thermistor exceeds a reference rate of change at a predetermined point in time, determines the point in time as a point in time of the operation to detect the temperature of the entry of the drum and the time, and
wherein the point in time of the operation comprises a first point in time of the operation when the heater is turned OFF according to the operation of the thermostat, and a second point in time of the operation when the heater is turned ON after being turned OFF according to the operation of the thermostat.

2. The dryer of claim 1, wherein:
the thermistor is provided at a hot blast duct configured to introduce hot air to the inside of the drum.

3. The dryer of claim 1, wherein:
the first point in time of the operation is a point in time when a temperature of the entry of the drum detected by the thermostat is provided with a maximum value.

4. The dryer of claim 3, wherein:
the second point in time of the operation is a point in time when the temperature of the entry of the drum detected by the thermostat is provided with the minimum value.

5. The dryer of claim 4, wherein:
the control unit is configured to calculate a temperature difference between the maximum temperature at the first point in time of the operation and the minimum temperature at the second point in time of the operation, calculate a time difference between a time at the first point in time of the operation and a time at the second point in time of the operation, and detect the degree of the blockage of the exhaust duct by using the temperature difference and the time difference that are calculated.

6. The dryer of claim 5, wherein:
the control unit stores a table capable of calculating the degree of the blockage of the exhaust duct by use of the temperature difference and the time difference.

7. The dryer of claim 6, wherein:
the control unit is configured to detect the degree of the blockage of the exhaust duct at each stage level based on data stored in the table.

8. The dryer of claim 1, wherein:
the control unit is configured to display the detected degree of the blockage of the exhaust duct at each stage level with a display unit.

9. The dryer of claim 8, wherein:
in a case that the display unit is a liquid crystal display (LCD), the display unit is configured to display different warning messages in the form of text based on the degree of a blockage of the exhaust duct.

10. The dryer of claim 9, wherein:
the display unit is configured to display the warning message in a form of an expression of emphasis including at least one of colorization, boldfacing, and italicization, or in a continuous manner for a predetermined period of time.

11. The dryer of claim 8, wherein:
in a case that the display unit is a light emitting diode (LED), the display unit is configured to display a blockage icon by lighting or flashing the blockage icon based on the degree of the blockage of the exhaust duct.

12. The dryer of claim 11, wherein:
the display unit is configured to continuously displaying the blockage icon for a predetermined period of time.

13. The dryer of claim 1, wherein:
the thermostat is a safety apparatus installed at a side surface or adjacent to the heater and configured to mechanically operate based on the temperature of the heater.

14. The dryer of claim 1, wherein:
the exhaust duct comprises a front exhaust duct and a rear exhaust duct to guide the discharging of the air that is passed through the drum, and an outside exhaust duct connected to the rear exhaust duct to guide the discharged air to an outdoor location.

* * * * *